United States Patent
Rhodes

(10) Patent No.: US 6,865,383 B2
(45) Date of Patent: Mar. 8, 2005

(54) METHOD OF NOTIFYING A WIRELESS SUBSCRIBER AS TO CALL PAYMENT RESPONSIBILITIES

(75) Inventor: Jeffrey Rhodes, Redmond, WA (US)

(73) Assignee: Cingular Wireless II, Inc., Redmond, WA (US)

( * ) Notice: Subject to any disclaimer, the term of this patent is extended or adjusted under 35 U.S.C. 154(b) by 35 days.

(21) Appl. No.: 10/267,798

(22) Filed: Oct. 10, 2002

(65) Prior Publication Data

US 2003/0032405 A1 Feb. 13, 2003

Related U.S. Application Data

(63) Continuation of application No. 09/315,087, filed on May 19, 1999.
(60) Provisional application No. 60/113,866, filed on Dec. 24, 1998.

(51) Int. Cl.[7] .................................................. H04Q 7/38
(52) U.S. Cl. ...................... 455/406; 455/414.1; 455/415
(58) Field of Search ............... 455/406–8, 414.1–414.3, 455/415, 560, 567, 566

(56) References Cited

U.S. PATENT DOCUMENTS

| | | | | |
|---|---|---|---|---|
| 5,557,664 A | * | 9/1996 | Burns et al. ............ | 379/114.21 |
| 6,169,891 B1 | * | 1/2001 | Gorham et al. ............. | 455/408 |
| 6,529,726 B1 | * | 3/2003 | Rhodes ....................... | 455/406 |

* cited by examiner

Primary Examiner—Nay Maung
Assistant Examiner—Philip J. Sobutka
(74) Attorney, Agent, or Firm—Kenyon & Kenyon

(57) ABSTRACT

A method provides that a subscriber can receive calls through a wireless terminal whereby if the calls originate with one number the called party pays and if the calls originate with another number the calling party pays. Information is transferred to the wireless terminal so that a data field normally used to identify the calling party is used to indicate to the called party who has assumed responsibility for payment of the call.

7 Claims, 3 Drawing Sheets

METHOD OF NOTIFYING A WIRELESS SUBSCRIBER AS TO CALL PAYMENT RESPONSIBILITIES

CROSS REFERENCE TO RELATED PATENT APPLICATIONS

This patent application is a continuation of U.S. application Ser. No. 09/315,087, filed May 19, 1999 entitled METHOD OF NOTIFYING A WIRELESS SUBSCRIBER AS TO CALL PAYMENT RESPONSIBILITIES, which is incorporated herein by reference, which is a non-provisional application of provisional application 60/113,866 entitled METHOD OF NOTIFYING A WIRELESS SUBSCRIBER AS TO CALL PENDING RESPONSIBILITIES which was filed on Dec. 24, 1998.

TECHNICAL FIELD

The present invention is directed to a method for identifying when a subscriber is responsible for paying for a wireless call. More particularly, in an environment in which a user may subscribe to a "calling party pays" service for wireless communications, the present invention provides a technique for notifying the subscriber that a received wireless call is either a "calling party" pays call or "called party pays" call.

BACKGROUND OF THE INVENTION

Wireless communication, a popular mode of carrying voice and/or data information between parties, have enabled subscribers to engage in mobile communications. Historically, the wireless subscriber has assumed responsibility for paying for all calls involving the wireless terminal device. That is, the subscriber pays not only for calls originating from the wireless device, but also agrees to pay for all calls directed to the wireless device. These fees include the air time charges for the wireless device as well as any long distance charges arising from the fact that the wireless device is roaming (i.e., outside of its normal service region).

Depending on the subscriber's intended use of the wireless phone, it may be desirable to the user or subscriber to have the option of agreeing to pay for receiving calls from some parties while requiring that other calling parties actually absorb the costs for contacting the subscriber on the wireless communication device.

An example of a system in which a mobile station is serviced is illustrated in block diagram form in FIG. 1. Here, mobile station 10 can communicate via over the air signals with a base station (BS) that is assigned to the geographic region in which the mobile station is located. The base station is coupled to a mobile switching center (MSC) which is coupled to the PSTN, for example, through a local exchange carrier (LEC). This enables the mobile station to originate a call to another party such as a user at a wireline phone connected to the PSTN. Alternatively, in the known system, a caller can dial the mobile identification number (MIN) of the subscriber's wireless terminal. That call is then set up by the wireless service provider. First, control signals are transmitted via the Signaling System 7 (SS7) network (shown as the dashed lines) to the Home Location Register (HLR) for the wireless terminal. The HLR includes information about where the terminal device was last registered, namely it identifies a serving MSC (S-MSC). The call can then be routed to the S-MSC associated with mobile station 10 and a call can be connected to the mobile station via the S-MSC.

In an effort to solve the issue of the called party paying for all calls, it has been proposed to provide a calling party pays service. This service could rely on a number translation database in much the same manner that "800" services now operate. Namely, rather than the user giving a MIN to calling parties, the user would be assigned a "500" number for example and all such 500 number calls would be routed to a special servicing database which would correlate or translate the 500 number to the wireless terminal's MIN. In turn, the MIN would be used to identify the S-MSC and the call could be routed to the terminal device. All calls in this service would be paid for by the calling party.

While this may at first seem appealing to a subscriber, there might be some reluctance to subscribe to a service in which the only access number to the mobile terminal invokes the calling patty pays requirement. The typical subscriber may wish to absorb costs for some calls while requiring others to pay the costs for remaining calls. The 500 number translation arrangement proposed would not address this concern.

SUMMARY OF THE INVENTION

The present invention provides a technique by which a called party who has subscribed to a calling party pays service can identify whether the called party or the calling party is responsible for paying for a call which the terminal station has received. In accordance with an embodiment of the present invention, the terminal station has associated therewith two numbers, its MIN and a translation number, such as a "500 number". If a calling party attempts to access the subscriber via direct input of the MIN into the telephone system, then the called party is responsible for payment of the call. If, however, the calling party enters the "500 number" which is subsequently translated into the MIN, then the calling party assumes responsibility for paying for the call. In the latter circumstance, the data translation operation and the MSC's operation for transmitting call data to the mobile terminal operate together so as to advise the terminal station device that the received call is coming by way of an input of the "500 number" which indicates to the subscriber, even before answering the call, that the calling party will be paying for the received call. This arrangement provides the subscriber with the flexibility of having some percentage of the calls to their wireless terminal be the payment responsibility of calling parties and at the same time identifies to the wireless subscriber whether the call originated in such a manner that the calling party has assumed responsibility for paying for the call.

DETAILED DESCRIPTION

The present invention provides a technique by which the wireless subscriber can gain the benefits of a "calling party pays" service while still enabling situations where the subscriber will accept responsibility for calls to the wireless device and furthermore allows the user to differentiate such calls before answering the call. First, the present invention employs a technique in which the subscriber mobile station has associated therewith both a calling party pays number, for instance a 500 number, and its MIN. In this instance, if a calling party generates a call to the subscriber utilizing the MIN, then such a call would be treated as other wireless calls and the subscriber will assume the responsibility for payment of the call. If, however, the call is originated by a calling party utilizing the 500 number, the calling party will assume responsibility for the telephone call. In this arrangement then, the subscriber has the flexibility of allowing some people to contact them at the called party's expense while others are forced to assume the responsibility for contacting the wireless subscriber.

Figure 2:
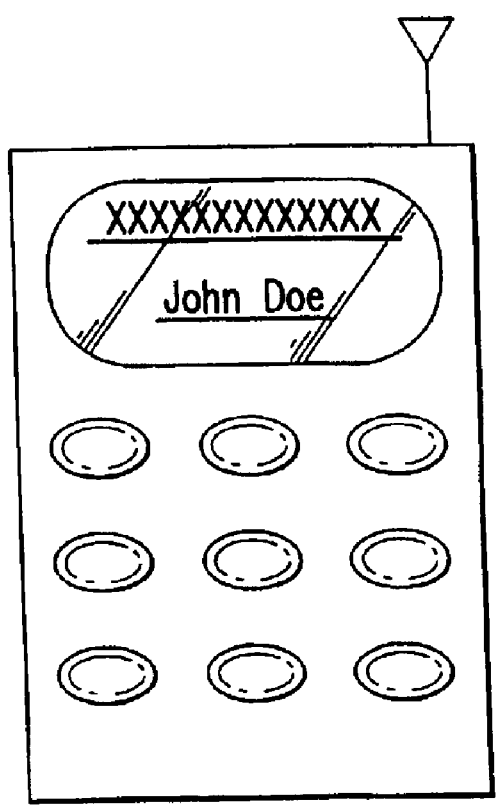
FIG. 2 illustrates a schematic view of a mobile terminal which can be used in connection with the present invention.

One sample wireless terminal which might be utilized in connection with the present invention is illustrated in FIG. 2. Here a display screen is illustrated as having two lines, top line 201 and second line 202. It has been described in certain wireless communication standards, namely IS-136, that calling party identification information can be transmitted to the wireless terminal and displayed on the two lines shown in FIG. 2. In the typical implementation of this technique, the S-MSC would extract information from the call control signal associated with the call to the wireless subscriber and cause that information to be displayed on the wireless device. That information would include the appropriate calling party ID information, namely a telephone number, appearing on line 201 and some other generic or name identifier which can be displayed on line 202. If the "500" number technique for sharing costs of accessing the wireless terminal were employed utilizing such a known wireless device, the subscriber would see on their wireless device an identification of the calling party and would not have any idea as to whether the calling party had assumed responsibility for paying for the call or whether the onus of payment rests on the subscriber. There would be no indication to the subscriber as to which technique the calling party used to access the subscriber's terminal.

Figure 1:
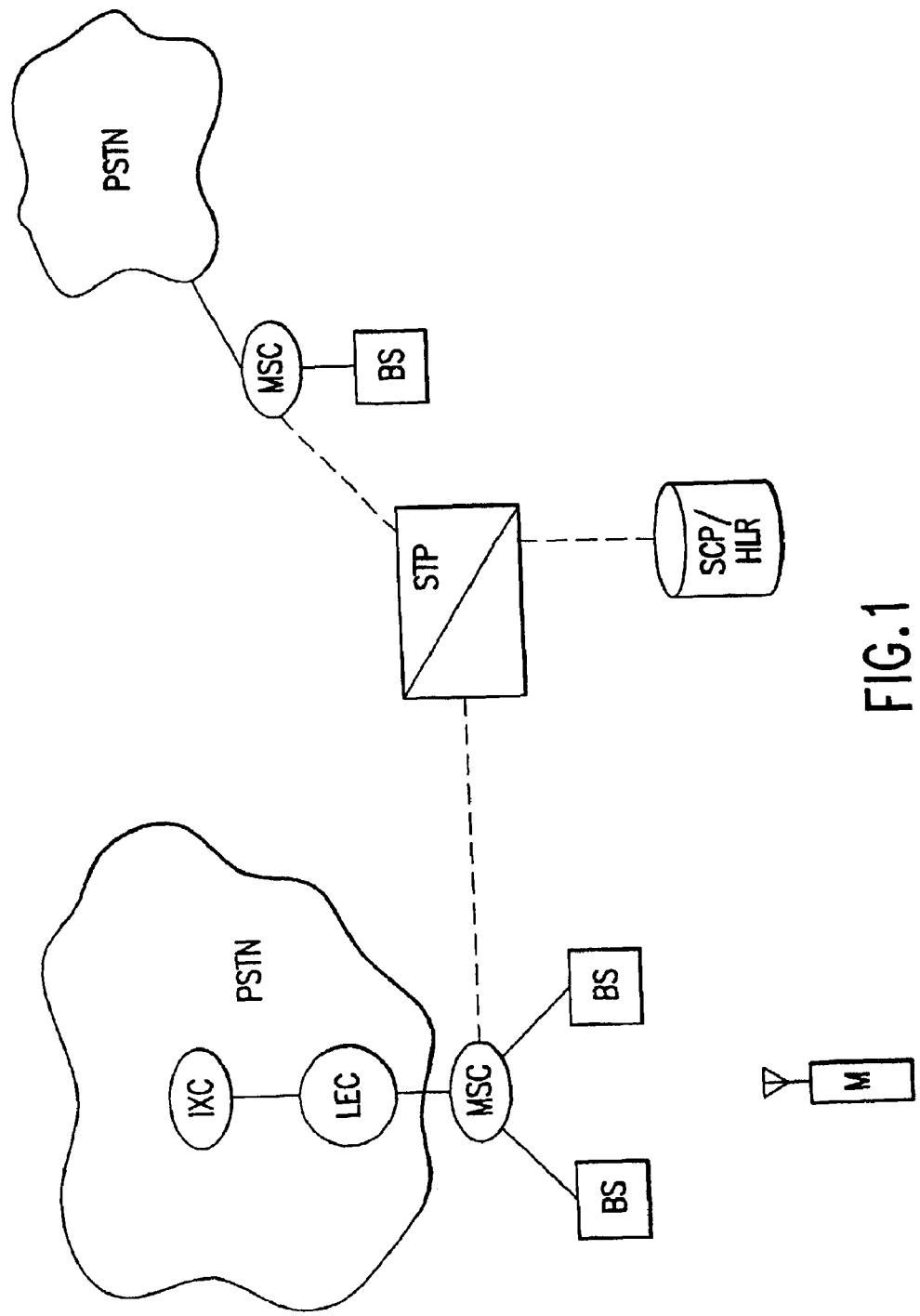
FIG. 1 provides a schematic view of a prior art system for wireless communications.
Figure 3:
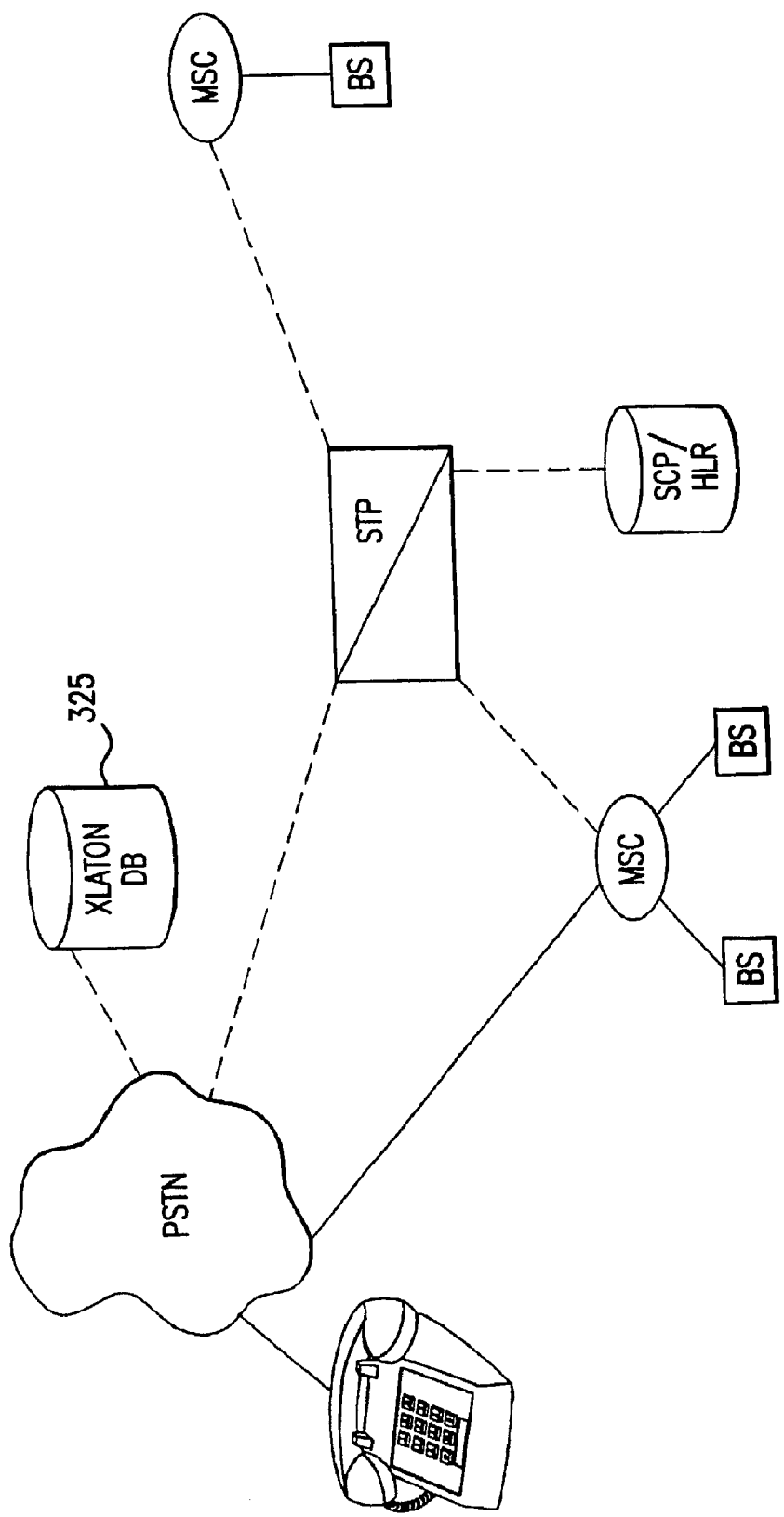
FIG. 3 illustrates a schematic diagram of a system which employs an embodiment of the present invention.

The present invention provides the indication that is not provided in the prior art. In particular, the present invention employs a technique by which the calling party identification number information can be altered so as to identify to the called party whether the call was originated with the MIN or whether the call originated with the 500 number. In particular, as illustrated in FIG. 3, a translation database 325 can be added to the network illustrated in FIG. 1 and can translate the 500 number for example, into a MIN and at the same time that the calling party information is forwarded to the S-MSC, the translation database for a controller associated with that database can substitute for certain portions of that calling party information the called number, namely the 500 number dialed by the calling party. If this 500 number is forwarded to the S-MSC, then the S-MSC can construct an IS-136 message for the mobile station incorporating the 500 number in place of some calling patty identification information which would otherwise be displayed on one or more lines of the wireless device. When this information is transmitted to the mobile terminal device and displayed at the time of call set up, before the called party answers, the subscriber is notified then that the call has originated through the calling party pays service. The subscriber can then make a decision whether to answer or receive the call using a full set of information as to whether the calling party has assumed responsibility for payment of the call. If the calling party has agreed to pay and the subscriber answers the call the calling party is billed for the call.

The technique of the present invention takes advantage of data fields which can be transported to wireless subscribers today and takes advantage of the translation technique used for implementing services such as 800 services so as to enable the subscriber to set up a calling party pays service and to have the calling party pays numbers "stuffed" into data fields transmitted to the terminal device. As a result, the subscriber can identify when the calling party has assumed responsibility for payment of a call directed to the called party.

The disclosed embodiments are illustrative of the various ways in which the present invention may be practiced. Other embodiments can be implemented by those skilled in the art without departing from the spirit and scope of the present invention.

What is claimed is:

1. A method of operating a database comprising:
   receiving calling party information, the calling party information corresponding to an incoming call and including a number of the calling party;
   translating a number of a called party into a mobile identification number (MIN); and
   modifying the calling party information by substituting the number of the called party for the number of the calling party if the incoming call is to be billed to the calling party's account.

2. The method of claim 1 further including forwarding the modified calling party information toward a mobile switching center (MSC), the MSC to use the modified calling party information to construct a calling party ID notification message and route the calling party ID notification message to a communication device using standard wireless caller ID technology.

3. The method of claim 2 further including forwarding the modified calling party information toward the MSC over a call control network.

4. The method of claim 3 wherein the call control network is a Signaling System 7 (SS7) network.

5. The method of claim 1 further including forwarding the received calling party information toward a mobile switching center (MSC) if the incoming call is to be billed to the called party's account.

6. The method of claim 1 further including receiving the calling party information over a call control network.

7. The method of claim 6 wherein the call control network is a Signaling System 7 (SS7) network.

* * * * *